(12) United States Patent
Chien et al.

(10) Patent No.: US 8,964,161 B2
(45) Date of Patent: Feb. 24, 2015

(54) ELECTRO-OPTICAL DEVICE AND METHOD FOR CONTROLLING COLOR WITH POLYMER STABILIZED LIQUID CRYSTAL

(75) Inventors: Liang-Chy Chien, Hudson, OH (US); Shin-Ying Lu, Kent, OH (US)

(73) Assignee: Kent State University, Kent, OH (US)

( * ) Notice: Subject to any disclaimer, the term of this patent is extended or adjusted under 35 U.S.C. 154(b) by 515 days.

(21) Appl. No.: 12/802,906

(22) Filed: Jun. 16, 2010

(65) Prior Publication Data

US 2010/0315585 A1 Dec. 16, 2010

Related U.S. Application Data

(60) Provisional application No. 61/268,738, filed on Jun. 16, 2009.

(51) Int. Cl.
*G02F 1/137* (2006.01)

(52) U.S. Cl.
CPC .. *G02F 1/13718* (2013.01); *G02F 2001/13793* (2013.01)
USPC ............ 349/183; 349/184; 349/185; 349/186

(58) Field of Classification Search
USPC .......................................... 349/201, 183–186
See application file for complete search history.

(56) References Cited

U.S. PATENT DOCUMENTS

| | | | | |
|---|---|---|---|---|
| 2005/0007531 A1* | 1/2005 | Okada et al. | ................... | 349/129 |
| 2005/0185131 A1* | 8/2005 | Miyachi et al. | ................ | 349/167 |
| 2008/0259254 A1* | 10/2008 | Kikuchi et al. | .................. | 349/88 |

OTHER PUBLICATIONS

Hirotsugu Kikuchi, Hiroki Higuchi, Yasuhiro Haseba and Takashi Iwata, "62.2: Invited Paper: Fast Electro-Optical Switching in Polymer-Stabilized Liquid Crystalline Blue Phases for Display Application," SID 07 Digest, pp. 1737-1740.*
H. J. Coles and H. F. Gleeson, "Electric Field Induced Phase Transitions and Colour Switching in the Blue Phases of Chiral Nematic Liquid Crystals," Mol. Cryst. Liq. Cryst., 1989, pp. 213-225, vol. 167, Gordon and Breach Science Publishers S.A.*
Ge et al. (Electro-optics of polymer-stabilized blue phase liquid crystal displays, Applied Physics Letters 94, 101104 (2009).*
A polymer-stabilized single-layer color cholesteric liquid crystal display with anisotropic reflection, Applied Physics Letters 91, 113119 (2007); Lu et al.*
Wenyi Cao, Antonio Muñoz, Peter Palffy-Muhoray and Bahman Taheri, "Lasing in a three-dimensional photonic crystal of the liquid crystal blue phase II," *Nature Materials*, Oct. 2002, pp. 111-113, vol. 1, Nature Publishing Group.
H.-S. Kitzerow, P. P. Crooker, S. L. Kwok, J. Xu and G. Heppke, "Dynamics of blue-phase selective reflections in an electric field," *Physical Review A*, Sep. 15, 1990, pp. 3442-3448, vol. 42, No. 6, The American Physical Society.
Shin-Ying Lu and Liang-Chy Chien, "A polymer-stabilized single-layer color cholesteric liquid crystal display with anisotropic reflection," *Applied Physics Letters*, 2007, pp. 131119-1, 131119-2 and 131119-3, vol. 91, American Institute of Physics.
H.-S. Kitzerow, "The Effect of Electric Fields on Blue Phases," *Mol. Cryst Liq. Cryst.*, 1991, pp. 51-83, vol. 202, Gordon and Breach Science Publishers S.A.

* cited by examiner

*Primary Examiner* — Lauren Nguyen
(74) *Attorney, Agent, or Firm* — Fay Sharpe LLP; Joseph D. Dreher

(57) ABSTRACT

The present invention provides an electro-optical device comprising a cell of polymer-stabilized blue phase (PSBP) liquid crystal under an electrical field and a method of controlling the reflection and transmission of an incident electromagnetic radiation such as visible light, by way of controlling the electrical field. The invention exhibits merits such as cost-effectiveness; simpler manufacturability due to the removal of requirements of polarizer and color filter; and fast switching, among others.

28 Claims, 8 Drawing Sheets

(a)

(b)

(c)

(d)

(a)

(b)

(a)

(b)

ELECTRO-OPTICAL DEVICE AND METHOD FOR CONTROLLING COLOR WITH POLYMER STABILIZED LIQUID CRYSTAL

This application claims priority based on the U.S. Provisional Application 61/268,738 filed on Jun. 16, 2009, which is incorporated herein by reference in its entirety.

BACKGROUND OF THE INVENTION

The present invention relates to an electro-optical device and a method of controlling the reflection or transmission of an electromagnetic radiation in the electro-optical device. It finds particular application in conjunction with a switchable filter, a laser with tunable lasing, a beam steering device, a wavelength multiplexing device, a telecommunication device, an e-book, a display such as a LCD TV, and an electrically-tunable color display, and will be described with particular reference thereto. However, it is to be appreciated that the present exemplary embodiment is also amenable to other like applications.

Liquid crystal (LC) blue phases (BPs) are among the most interesting self-organized structures in the field of liquid crystals, which have been under numerous studies in the past decades. Liquid crystals generally are anisotropic liquids rich with physical properties; however, blue phase LCs are an exception, as they are optically isotropic liquid and are not birefringent. Although BPs are optically active and rotate in the direction of polarization of linearly polarized light as the helical phase, a small double twist structure is more stable than a single twist structure of a cholesteric LC, as the structure of BP is stabilized by its coexistence with disclination lines.

BPs are a highly fluidic isotropic medium that possesses a three-dimensional periodical structure useful for field-induced birefringence. The field-induced birefringence does not need alignment layers of substrates as those of the conventional liquid crystal displays (LCDs) do. There is however a major limitation for the possible applications of BPLCs because of its narrow phase transition temperature. Recently, the problem has been improved by using a polymer network (see H. Kikuchi, H. Higuchi, Y. Haseba, T. Iwata, Fast Electro-optical switching in polymer-stabilized liquid crystalline blue phases for display application, SID Digest, 37, 1737, 2007) or bimesogenic LC to stabilize the BP. Both methods yield a BP with a temperature that exceeds 50K. It is believed that chiral pitch of the BP affects its phase range, but the mechanism for widening the BP temperature range is still not clear. A large BP temperature range using polymer stabilization led to the recent development of a blue phase mode LCD TV. Lasing in a three-dimensional photonic crystal of the liquid crystal blue phase II was recently reported in W.-Y. Cao, et al., Lasing in a three-dimensional photonic crystal of the liquid crystal blue phase II, Nature Mater. 1, 111-113 (2002).

Liquid crystals are also widely used in optical tuning, which is of value in devices ranging from lasing, laser beam steering, switchable wavelength filters and wavelength multiplexing for telecommunication. For example, liquid crystals can be used for switchable filters in configurations by varying the magnitude of the retardation value of the output polarization. Previous efforts to produce a liquid crystal tunable filter (LCTF) focused on polarization interference filters. Liquid crystal molecules rotate in orientation to the initial optic axis aligned by the surface alignment layers in response to an applied voltage. However, because of the trade-off between throughput and spectral purity, the grating or filter structure is not optimum for implementing a multiple wavelength filter. An example of electrically tunable filter is fabricated by exposing a nematic liquid-crystal and photosensitive pre-polymer mixture to an interference pattern generated by a laser source. The grating structures form switchable and tunable reflection gratings with reflection wavelengths in the ultraviolet, visible and infrared regions, depending on fabrication conditions.

Current transmissive type flat panel displays requires color filters to generate vivid color images. Their light efficiency is low because light passes through polarizers a total of four times. The light efficiency is thus decreased by the absorption of the polarizer (~6%). For particle-based reflective displays including electrophoretic displays, quick-response-particle displays and electrowetting displays, their brightness is dimmed due to the light absorption of color filters.

Currently, most of the cholesteric liquid crystal based spectral filters and reflective cholesteric displays, whose Bragg-reflected wavelength are static types, are tuned only by adjusting the amount of chiral additive to a nematic material. This approach disadvantageously fixes the spectral wavelength of the device; and at most, one can only turn a pixel in the filter on or off but cannot change its spectral wavelength. One may also use a patterned electrode in a particular layer with different periodicity to transmit or reflect a specific wavelength; however, this reduces the filtering capability as well as the light transmission or reflective brightness of a device. In S.-Y. Lu, L.-C. Chien, A polymer-stabilized single layer color cholesteric liquid crystal display with anisotropic reflection, Appl. Phys. Lett. 91, 131119-1 131119-3 (2007), it has been reported that polymer and cholesteric liquid crystal composite films can be used for electrically tunable reflected color. The phase separated polymer enables tuning of the Bragg reflected wavelength by varying the magnitude of the applied electric field.

It has been reported that application of electric fields across BP materials in an electro-optical cell can induce a small shift in Bragg-reflected wavelength at a low applied voltage, according to H. J. Cole, H. P. Gleeson, Electric Field Induced Phase Transitions and Colour Switching in the Blue Phases of Chiral Nematic Liquid Crystals, Mol. Cryst. Liq. Cryst., 167, 213-225 (1989); and H.-S. Kitzerow, The effect of electric fields on blue phases, Mol. Cryst. Liq. Cryst., 202, 51-58 (1991). The small color switches were observed in both BPI and BPII due to the field-induced phase transition to both cholesteric focal conic and homeotropic nematic states. Both of these electric field induced phenomena are described as functions of the applied voltage and frequency. The field induced color switch was found to have two distinct response times associated with it, one of which is fast (~100 μs) and another much slower (~1-10 ms).

The field-induced color (FIC or Bragg reflection) of a blue phase liquid crystal material results from the electrostriction-induced strain in BP phase. The electric field induced phenomena are reported as functions of the applied voltage, pulse width and frequency. (H.-S. Kitzeow, P. P. Crooker, S. L. Kwok, J. Xu, G. Heppke, *Dynamics of blue-phase selective reflections in an electric field*, Phys. Rev. A, 42, 3442-3448 (1990)). The response time of electrically-controllable color is found to be in the range from a few hundreds of microseconds to a few seconds depending on the driving scheme.

Advantageously, the present invention provides an electro-optical device and a method of controlling the reflection and transmission of an electromagnetic radiation, which exhibit merits such as cost-effectiveness; simpler manufacturability due to the removal of requirements of polarizer, color filter, and sometimes alignment; improved temperature stability;

wide color gamut; wide range uniform color switching (~160 nm); adaptability to single or multi-cell technology; and fast switching, among others.

BRIEF DESCRIPTION OF THE INVENTION

One aspect of the invention provides an electro-optical device comprising a cell of polymer-stabilized blue phase (PSBP) liquid crystal and an electrical field generator. The generator generates an electrical field which is applied on the liquid crystal; and such liquid crystal reflects or transmits an incident electromagnetic radiation into a second electromagnetic radiation. The wavelength (such as the peak wavelength), the intensity, or both, of the second electromagnetic radiation is a function of at least one of the frequency, the amplitude, the wave form, and the pulse width of the electrical field.

Another aspect of the invention provides a method of controlling the reflection and transmission of an electromagnetic radiation in an electro-optical device comprising:

(i) providing a cell of polymer-stabilized blue phase (PSBP) liquid crystal;

(ii) providing an electrical field generator;

(iii) generating an electrical field from the generator;

(iv) applying the electrical field on the liquid crystal;

(v) reflecting and/or transmitting an incident electromagnetic radiation on the liquid crystal into a second electromagnetic radiation; and (vi) varying at least one of the wavelength (such as peak wavelength) and the magnitude of the second electromagnetic radiation by varying the intensity of the electrical field.

DETAILED DESCRIPTION OF THE INVENTION

Figure 1:
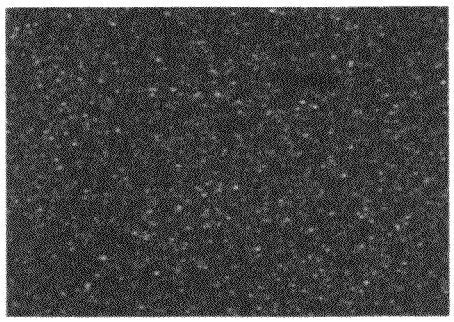
FIG. 1 shows the photomicrographs of a PSBP in an EO cell (a) at 29° C., (b) at 24° C., (c) under an applied voltage of 63V at room temperature (21° C.), and (d) under an applied voltage of 0V at room temperature (21° C.)
Figure 1:
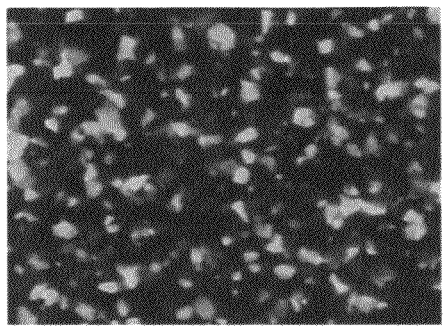
Figure 1:
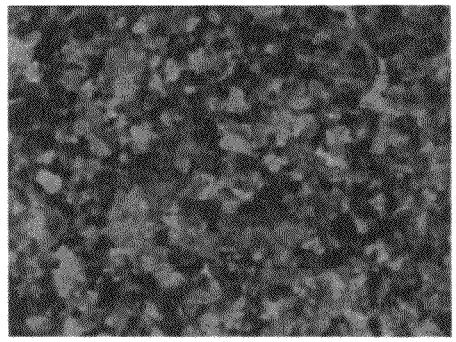
Figure 1:
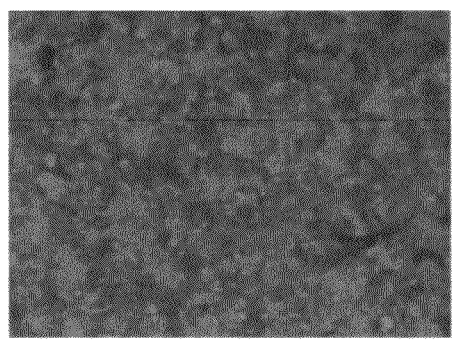

In various embodiments, the invention provides a new electro-optical device for field-induced color (FIC) based on polymer-stabilized blue phase (PSBP) liquid crystals. An example of the device employs a blue phase forming liquid crystal and a phase-separated polymer in an electro-optical cell with two electrodes separated by a gap between the substrates.

In an embodiment, the peak wavelength of the second electromagnetic radiation such as light may be greater than (red shift) that of the incident electromagnetic radiation when the intensity of the electrical field is greater than zero. Any known radiation source such as light source may be used to emit the incident electromagnetic radiation. The wavelength of the second electromagnetic radiation may be tunable, e.g. reversibly tuned back to its initial value when the electrical field is reduced to zero. For example, applying an electrical field across the cell results in, for example, a wavelength tunable device with a red shift (color tuning) in the Bragg reflected wavelength. In a preferred embodiment, the color tuning is reversible and with a wide color range covering at least the visible spectrum (e.g. 400 nm-800 nm).

In a specific embodiment, the invention provides a liquid crystal tunable filter device comprised of polymer or polymer-network and a blue phase liquid crystal (BPLC), whose spectra wavelength can be electrically switched to reflect or transmit a second wavelength. The device may be comprised of a pair of substrates with transparent conductive electrodes. A blue phase liquid crystal and a small amount of polymer network forming reactive monomer are deposited in between the substrates. The phase-separated polymer network, homogeneously or in-homogeneously distributed between the substrates, is formed by polymerization. The color or wavelength tuning may be achieved by applying an electric field across the substrates to change the pre-selected Bragg reflection wavelength of a BPLC to reflect a second color or wavelength subject to the wave form, pulse width, frequency and amplitude of applied electric field. Moreover, the switchable filters can be in plural form of a vertical stack to provide the desired range and efficiency of wavelength tuning and to enhance the reflectivity, using similar single-panel fabrication method with patterned pixel electrodes.

Preferably, the liquid crystal is in blue phase at the operation temperature range of the device such as from about 20° C. to about 30° C.

In various embodiments, the polymer-stabilized blue phase (PSBP) liquid crystal comprises a nematic liquid crystal and one or more chiral dopants. The nematic liquid crystal may be selected from the group consisting of a low viscosity LC (e.g. lower than 100 mPa·s such as 90 mPa·s) such as MLC6080; a high birefringence LC such as BL006; a high dielectric anisotropy LC such as MLC 6080; a fluorinated LC such as ZLI 4792; and any combination thereof. The chiral dopant may be an optically active organic compound selected from the group consisting of CB15, C15, R811, S811, R1011, S1011, and any combination thereof. In an embodiment, the polymer-stabilized blue phase (PSBP) liquid crystal comprises a polymer network formed from photo-polymerization of reactive monomers, which is mesogenic, isotropic or chiral. For example, the reactive monomer can be selected from monomers containing a mono or multiple polymerizable group such as acrylate, epoxy, vinyl ether, or any combination thereof. Examples of the reactive monomer include RM257 and HDDA. An example of the photoinitiator is Irgacure651.

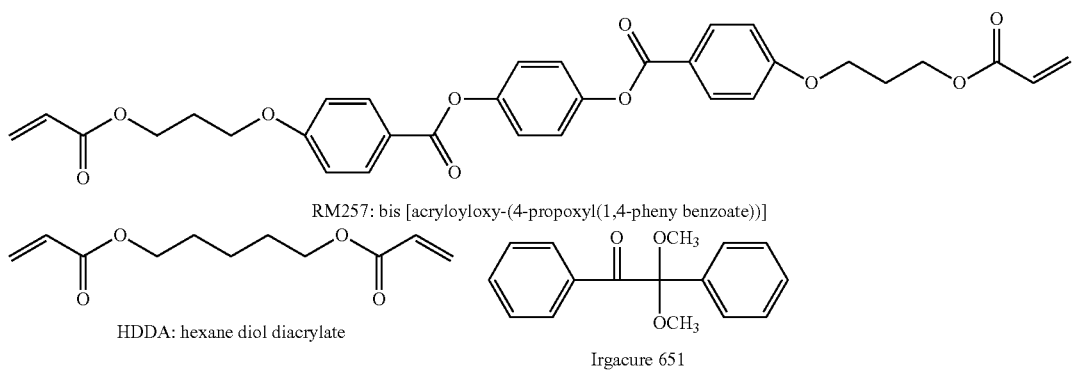

RM257: bis [acryloyloxy-(4-propoxyl(1,4-pheny benzoate))]

HDDA: hexane diol diacrylate

Irgacure 651

The device of the invention can be built on substrates that are rigid or flexible and with patterned structure to provide physical support to the substrates against external stress and mechanical shock.

In some embodiments, the electro-optical device of the invention may be switchable filters which are polarization independent, and free from color filter and polarizer. An alignment layer may be used, but does not have to be used, in the electro-optical device of the invention. In an embodiment, one or two of the substrates may be combined with an alignment layer. Alternatively, the cell does not include any alignment layer at all. Due to the advantages and ability of controlling the electrically-switched colors, one can fabricate devices for application without alignment layers, color filter and polarizers.

The present invention has numerous advantages, such as cost-effectiveness; energy saving; better temperature stability at operation range; polarizer free (polarization and angular independent of reflection); color filter free; alignment free or polyimide (PI) for homogeneous, twisted and vertical alignment; wide color gamut (high color saturation, and narrow FWHM); wide wavelength tuning range; wide range uniform color switching (~160 nm); adaptability to single or multi-cell technology; low or high polymer content; sub-milliseconds response; and fast switching as a function of pulse width of the applied field. The polymer-stabilized blue phase technology is also an eco-friendly technology.

EXAMPLE 1

PSBP Preparation and Photomicrographs

This example provides a method of fabricating a BP mode cell in which the reflective spectral wavelength is electrically tunable. Electro-optical (EO) cells without alignment layers were used. The cells have substrates separated with glass spacers with desired gaps of 10 and 25 microns. A room-temperature BPLC consisting of a mixture of a nematic liquid crystal (34% of BL006, Merck) and a chiral dopant (66% of CB15, Merck) was prepared. The BPLC exhibits a blue phase with transition temperature of 8° C. (21-29° C.). A PSBP material comprised of a small amount of a reactive monomer (4.0% RM257, a mesogenic diacrylate from Merck), a photoinitiator (0.15% by the weight of reactive monomer RM 257) and the BPLC (95.94%) was uniformly mixed and loaded into the EO cells. The cells were subsequently exposed to a non-polarized UV light source (366 nm, 0.4 mW/cm$^2$) at the blue phase temperature of 24° C. or 27.5° C. for 1.5 hour to polymerize the reactive monomer. The resultant PSBP shows a slight decrease in the blue phase range.

The photomicrographs in FIG. 1 show the texture change of the PSBP in a 25 micron cell. The pictures were taken under crossed polarizers in a reflective mode. Panel (a) in FIG. 1 shows the PSBP photomicrograph at 29° C.; panel (b) at 24° C.; panel (c) under an applied voltage of 63V at room temperature; and panel (d) after switching off the electric field at room temperature. FIG. 1 demonstrates that the Bragg reflected wavelength in a PSBP shows a red shift with an increase in applied voltage. The PSBP shows a strong filed-induced reorientation of cubic lattice in the blue phase. After switching, the domain size of a BP increased as the relax time increased, as shown in Panels (a) and (d) in FIG. 1.

EXAMPLE 2

Reflectivity and Wavelength

Figure 2:
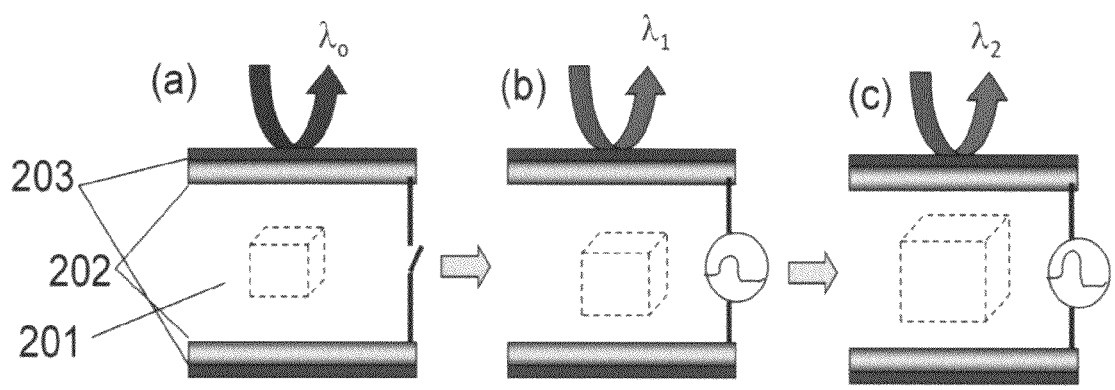
FIG. 2 is a schematic illustration of electrically switched color (reflected wavelength) of a PSBP cell due to size change of LC cubic lattice.

Without being bound to any particular theory, it is believed that the nature of the switching is dielectric and involves deformation of the periodical structure of an optically isotropic liquid crystal medium. FIG. 2 is a schematic illustration of electrically switched color of a PSBP cell. With reference to FIG. 2, a BPLC cubic lattice 201 is placed between two electrodes 202 and two substrates 203. The change of the size of the three-dimensional cubic lattice 201 and the reflected wavelength ($\lambda_0$, $\lambda_1$ and $\lambda_2$) as a function of the magnitude of applied voltage between the two electrodes 202. The field-induced structural change of the PSBP is transferred to the change in Bragg reflected wavelength. Since the liquid crystal molecules in the BP phase under the applied electric field change their initial scale of the three-dimensional structure, it is believed that a BPLC with either a positive or negative dielectric anisotropy will exhibit a similar FIC behavior.

Figure 3:
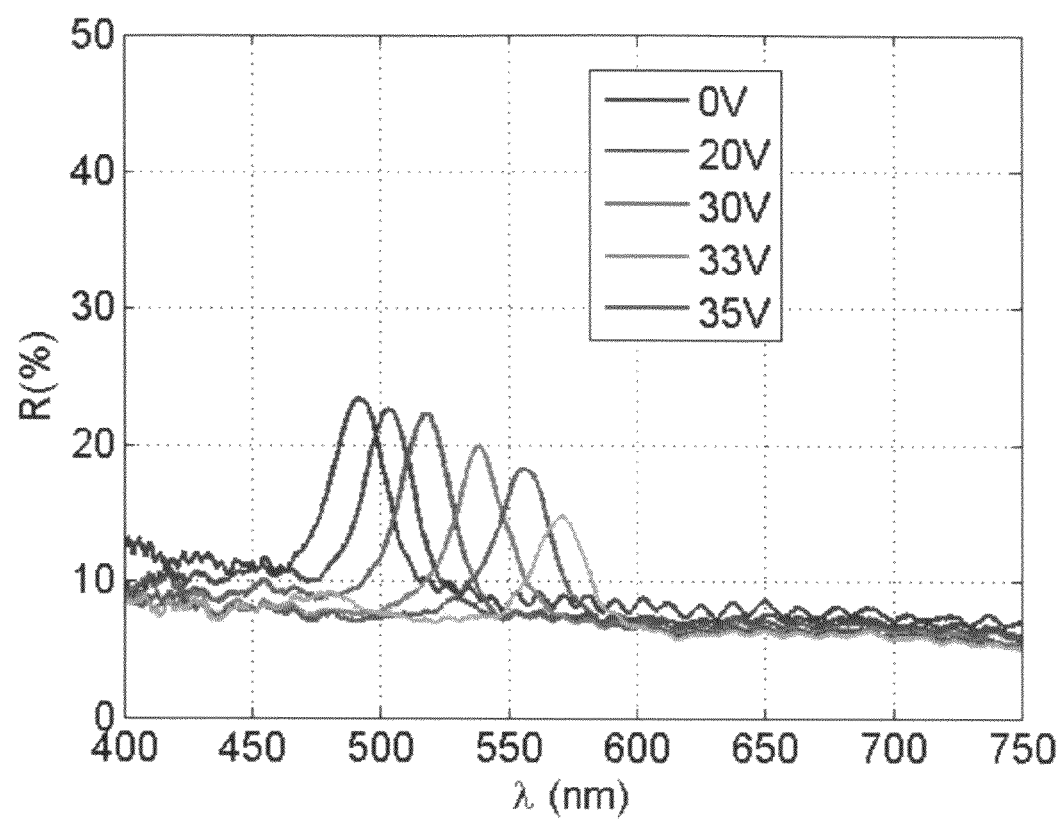
FIG. 3 shows the plot of reflectivity versus wavelength shift at different voltages applied on the PSBP cell with a 10 micron cell gap.

To test this model on FIC effect, a PSBP cell was prepared similarly to that in Example 1. The cell has a 10 micron cell gap, and the PSBP sample was similarly prepared by forming the phase-separated polymer at room temperature. FIG. 3 shows the plot of reflectivity versus wavelength shift at different voltages applied on the PSBP cell in which the PSBP was cured at the low end of its BP temperature. Referring to FIG. 3, there is a slight decrease in reflectivity due to the deformation of cubic lattices when a PSBP sample is switched to reflect a longer wavelength. The wavelength tuning of the PSBP cell is reversible. It was observed that there is an increase in reflectivity after switching the cell. The response time of the wavelength tuning for the PSBP is in the range of a few hundreds of microseconds depending on the ascending or descending in applied voltage.

Figure 4:
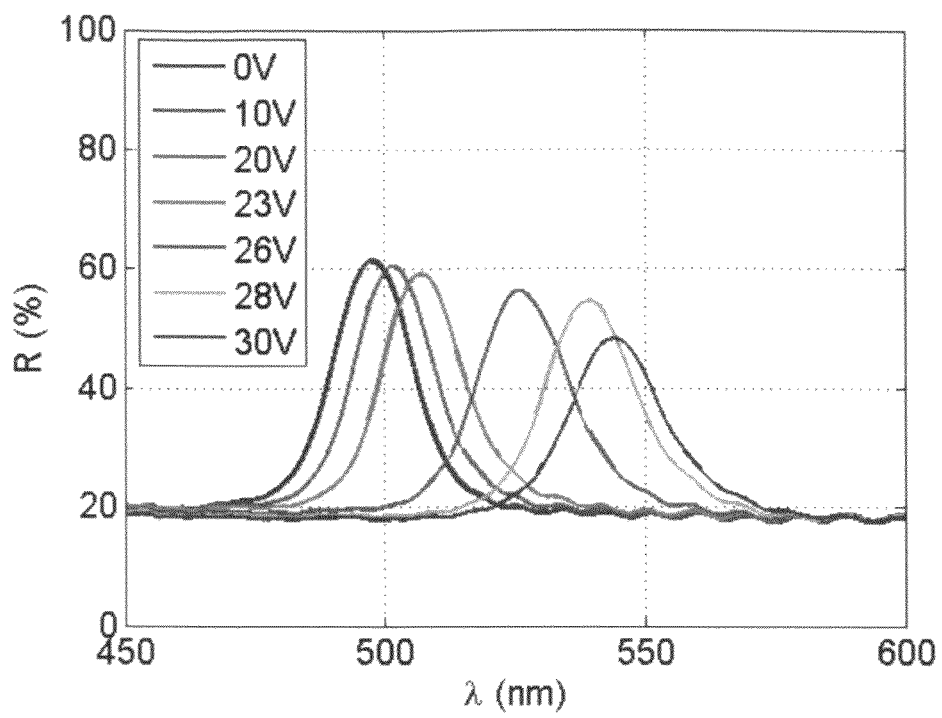
FIG. 4 shows the plots of reflectivity and wavelength shift of a PSBP cell under (a) ascending applied voltages and (b) descending applied voltages.
Figure 4:
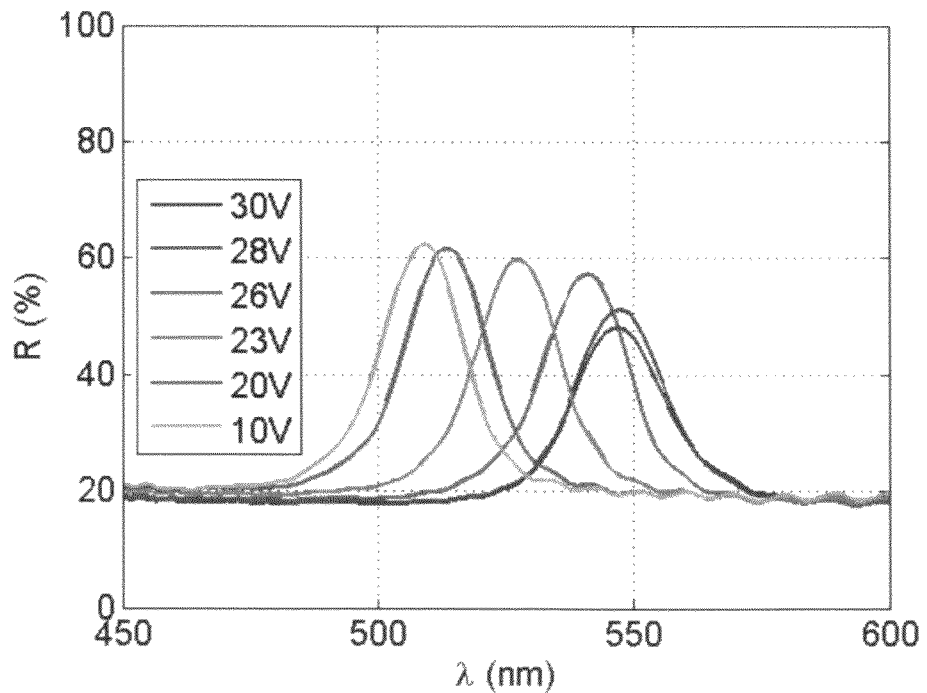

The FIC in a PSBP cell is reproducible regardless of cell thickness and BP temperature of sample preparation. A second example of FIC was demonstrated with a 10 µM PSBP cell, where the phase-separated polymer was formed at the upper part of the BP temperature range. FIG. 4 shows the plots of reflectivity and wavelength shift of the PSBP cell under (a) ascending applied voltages and (b) descending applied voltages. According to FIG. 4, the reflected wavelength shows a red shift in response to the increase in applied voltage and a blue shift in response to the decrease in applied voltage. In this experiment, FIC in a thin PSBP cell shows a similar trend of slight decrease in reflectance with the increase in applied voltage. However, the change in half bandwidth is negligible. A large cell gap may counterbalance the decrease in reflectivity, but the PSBP may require a higher switching voltage to induce a similar change in color. A hysteresis in FIC was observed during the voltage ramping.

EXAMPLE 3

Response Time

Figure 5:
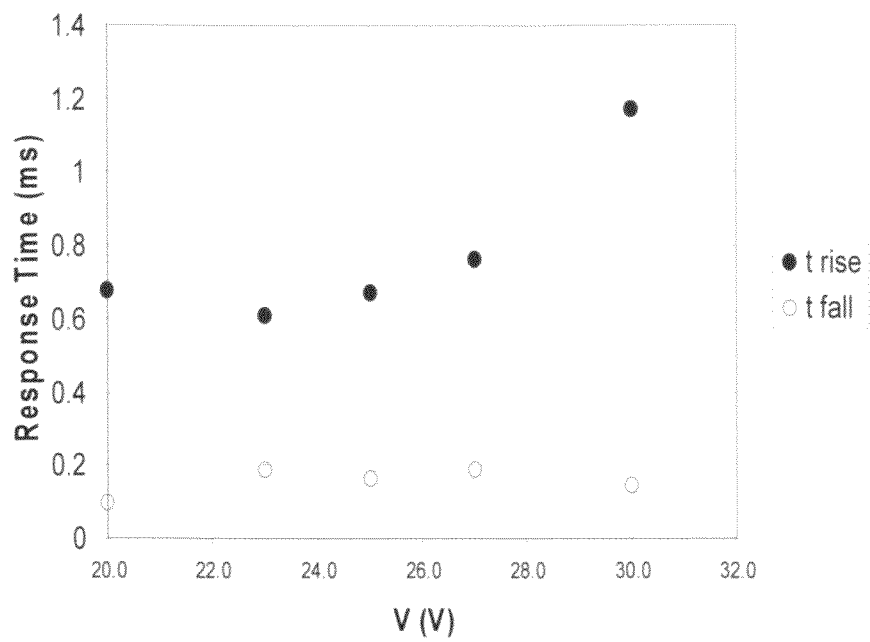
FIG. 5 shows the plots of (a) response time versus applied voltage of a 10 µm PSBP cell and (b) oscilloscope traces of transmittance under one pulse (15 ms) of applied voltage of 0 to 30 and 30 to 0 volt.
Figure 5:
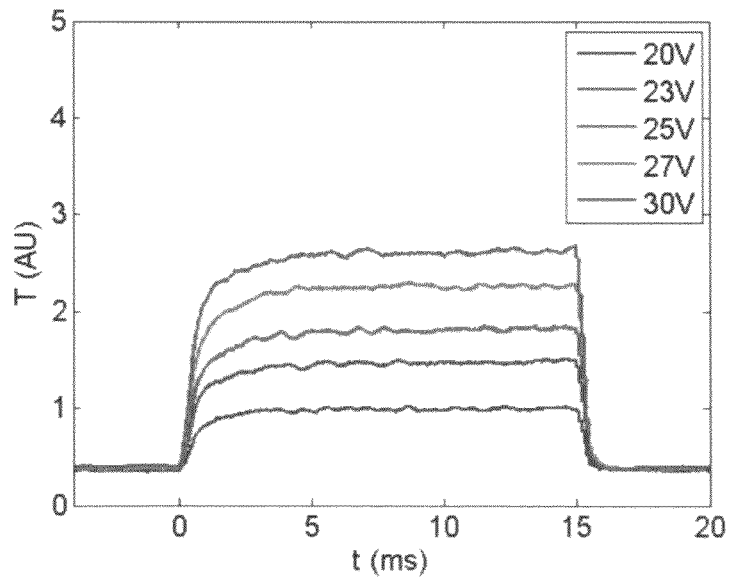

The response time of the FIC was also investigated using an Argon ion laser emitting at 514 nm and an electro-optical apparatus for measuring the reflectance as a function of the applied voltage. The detector was arranged to have a collection angle of 10° from the incident light beam. FIG. 5 shows the plots of (a) response time versus applied voltage of a 10 µm PSBP cell similar to Example 2 and (b) oscilloscope traces of transmittance under one pulse (15 ms) of applied voltage of 0 to 30 and 30 to 0 volt. FIG. 5 indicates the response time of a cell switched between a voltage of 0 and 30 with a pulse width of 15 ms. The FIC of the 10 µm PSBP cell has a threshold voltage of around 20 V. The response time depends on the tuned wavelength range, that is, the farther the wavelength shift, the longer the rising time. As believed, it takes more time for the lattice deformation to evolve at a higher voltage. The rise time of a tuned long wavelength (blue to yellow) is slightly over 1 ms while the rise time for a short wavelength tuning is very fast, around 700 ms. The fall time (switched from yellow green to deep blue) is also very fast around 200 µs and independent of the applied voltage.

The field-induced color (e.g. Bragg reflection) results from the electrostriction induced strain in BP phase. The compression in the x-axis or elongation in the z-axis is proportional to the square of applied voltage square. The FIC can appear in BPLC either with positive and negative dielectric anisotropy. The electrostriction coefficients are small in general (~$10^{-15}$-$10^{-14}$ $m^2V^{-2}$). The dynamic relaxation (~10 s) can be expressed as $$\tau \sim \frac{\gamma L^2}{K}$$

where $\gamma$ is the rotational viscosity, K is a Frank elastic constant, and L is the sample thickness.

In summary, the phase-separated polymer in a polymer-stabilized blue phase mode serves to stabilize the three-dimensional structure of the optical isotropic liquid crystal media and enables electrically tuning of the Bragg reflected wavelength. Alternatively, the wavelength tuning in a BPLC can be induced by light with the addition of a photochromic dye. A thick cell maintains the reflectivity of the switched color. The switchable filters of the present invention can be in plural form of a vertical stack to provide the desired range and efficiency of wavelength tuning and enhance reflectivity. The feature of field-induced color in a PSBP cell has potential electro-optical and optical applications such as displays, spatial light modulator, switchable filters, switchable mirrors, and beam steering devices. Using a high concentration of polymer dispersion will enable one to construct a device on flexible substrates using a continuous fabrication process.

EXAMPLE 4

Polymer Network Concentration

Figure 6:
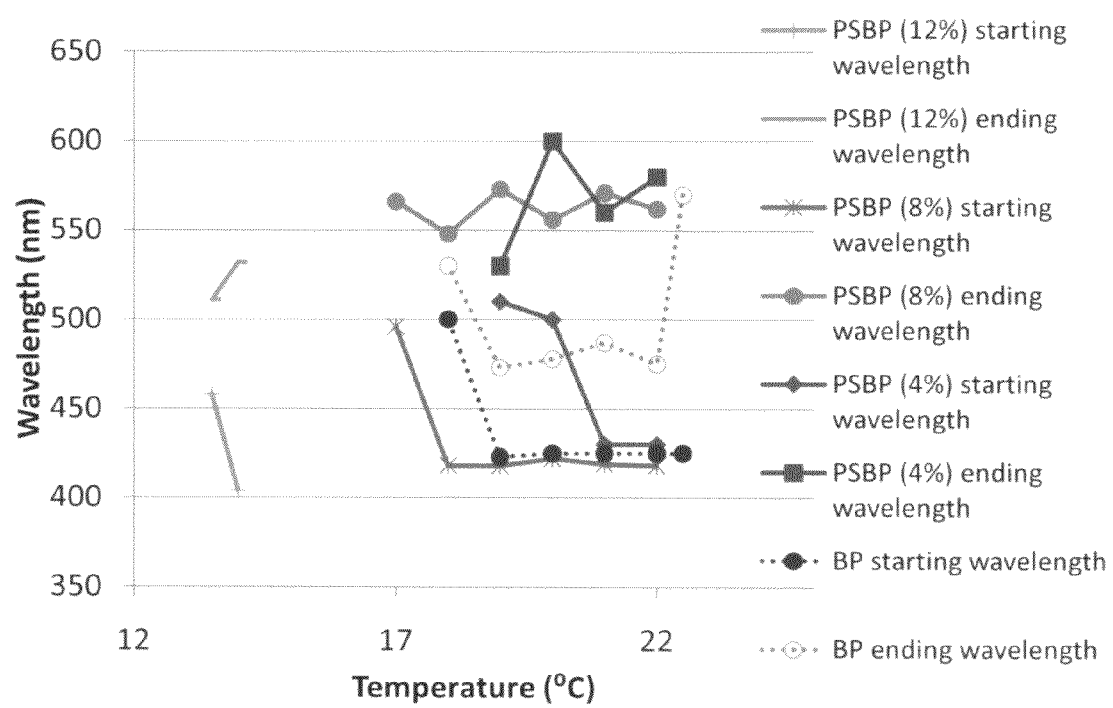
FIG. 6 shows the electrically tunable color range and temperature range of PSBPs with different concentrations of polymer network.

The effect of polymer network concentration on the tunable color range of PSBPs was investigated. The mixture for room temperature BP is composed of a nematic liquid crystal (BL006) and chiral dopant (CB15) with the weight ratio of 1 to 2. The monomer RM257 was prepared with four different concentrations: 0%, 4%, 8% and 12% by the weight of liquid crystal. The amount of photoinitiator (Irgacure 651) is 1% by the weight of monomer. The electro-optical cells are composed of rigid substrates with a top-down electrode configuration and with surface alignment layers provided for homogeneous alignment. The cell gap is kept at 10 µm using ball spacers to separate substrates. The PSBP mixture is filled into the cell at an isotropic state and cooled down to room temperature at a rate of 0.1° C./min. FIG. 6 shows the electrically tunable color range and temperature range of PSBPs with different concentrations of polymer network. With reference to FIG. 6, both the BP temperature range and tunable color range are polymer network concentration dependent. The tunable color range is doubled compared to that of the BP with the inclusion of a polymer network; however, the BP temperature range is slightly decreased. As the polymer network concentration is increased from 4% to 8%, a more stable tunable color range across the studied temperature range can be achieved and the BP temperature range is also increased. Conversely, the reflectance is reduced due to the scattering from the higher concentration of polymer network. When the concentration is increased to 12%, a rather small BP temperature range is observed. High concentration of polymer network may have disturbed the lattice arrangement of the BP. Instead of stabilizing BP, for a PSBP with high polymer content, both the electrically tunable color range and BP temperature range decrease dramatically in response to the applied electric field and temperature variation. The optimal polymer concentration for a PSBP with a wide tunable color range and BP temperature range fall in between 4% to 8% by weight.

EXAMPLE 5

Surface Alignment Effect

Several cell configurations have been considered to explore the performance of the tunable reflected colors. The BP mixture is composed of a nematic liquid crystal (BL006) and chiral dopant (CB15) with the weight ratio of 1 to 2. The PSBP sample has an additional reactive mesogenic monomer (4.52% of RM 257 based on the weight of BP liquid crystal, Merck) and a small amount of photoinitiator (0.04% of Irgacure 651 based on the weight of BP liquid crystal, Ciba Additive). The electro-optical cells are composed of rigid substrates with a top-down electrode configuration. First, the BP liquid crystals were injected into cells with no alignment layer. However, it was found that it is not necessary to form BP lattice with alignment layers on the substrates. Because, a PSBP cell with no alignment layer will be electrically shorted at around 4V/µm due to high ionic conductivity. Therefore, polyimide layers were spin coated on the glass substrates to prevent the cell from being shorted. The experimental data has shown that even with one alignment layer on one of the glass substrate will make higher electric field switching possible. This is because the polyimide may serve as an insulating layer for ions in the liquid crystal cells. In order to investigate the influence of surface alignment on the BP stability and electro-optical switching, cells with planar or vertical alignment layers were prepared. The surface alignment was found to help in enlarging the BP domain and widening the tunable color range. The results of substrate type and tunable color range are summarized in Table 1.

TABLE 1

Comparison of Substrate Types on Tunable Color Range

| Surface Alignment Condition | Tunable Range* | Results |
|---|---|---|
| No polyimide FIG. 7(a) | X | The cells are easily shorted. The electric switching is limited to short color tuning range. |
| With polyimide (PI 2555), Degenerate (no rubbing) planar alignment FIG. 7(b) | ○ | Reflectance is low after cooling from isotropic state. |
| With polyimide (PI 2555), Homogenous (rubbed) planar alignment FIG. 7(c) | ○ | Large size BP domain and large color tuning range |
| With polyimide (PI 1211), VA alignment FIG. 7(d) | Δ | BP domain is small due to the weak surface anchoring of VA alignment. |

*A comparison of tunable range between different surface alignment conditions. ○ is the best, Δ is fair, and X is the worst.

Figure 7:
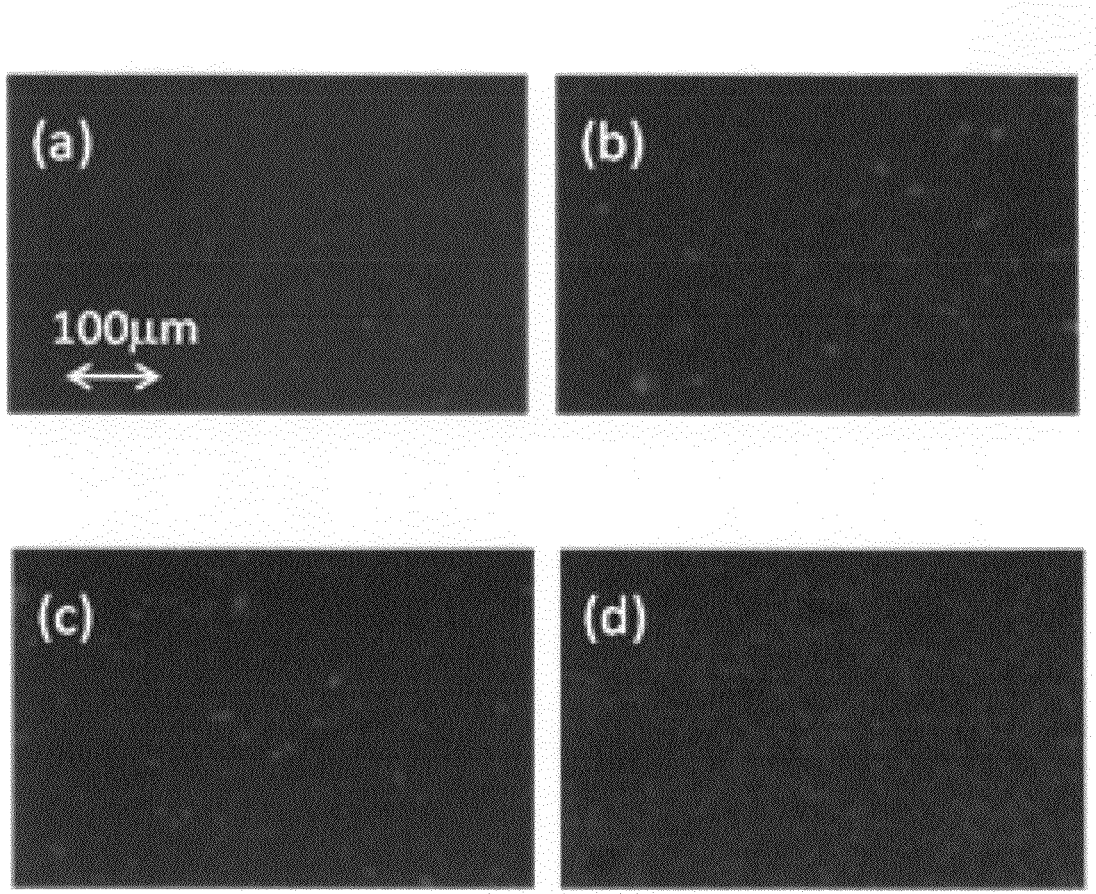
FIG. 7 shows the photomicrographs of the PSBP cells under crossed polarizers with different surface alignment conditions: (a) no polymer; (b) one substrate with spin-coated PI; (c) two substrates with PI alignment layers and rubbed for homogeneous alignment; and (d) two substrates with VA alignment layers.

FIG. 7 shows the photomicrographs of the PSBP cells under crossed polarizers with different surface alignment conditions: (a) no polymer; (b) one substrate with spin-coated PI; (c) two substrates with PI alignment layers and rubbed for homogeneous alignment; and (d) two substrates with VA alignment layers. With reference to FIG. 7, it can be clearly observed that the polymer network stabilizes bigger domains of BP (FIG. 7(b)). With the planar alignment, the domains are more uniform throughout the cell (FIG. 7(c)). As for the case of vertical alignment (VA) (Figure (d)), the BP domain doesn't grow as uniform as that in the cell with planar alignment.

Figure 8:
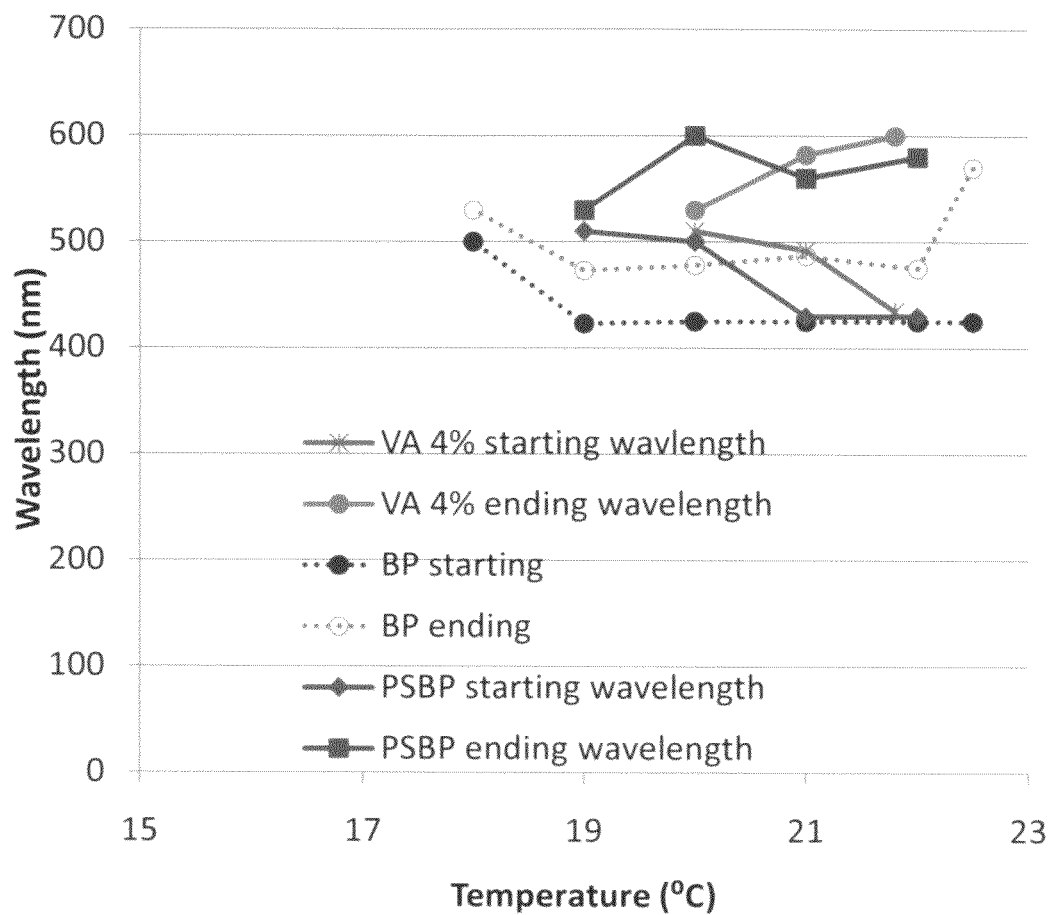
FIG. 8 is the plot of color tuning range versus temperature for BP mixtures with different surface alignment conditions.

FIG. 8 is the plot of color tuning range versus temperature for BP mixtures with different surface alignment conditions. With reference to FIG. 8, the tunable range generally decreases as the temperature decreases. Without the intension to be bound by any particular theory, this is because as the temperature decreases, BP is close to the phase transition temperature to chiral nematic. As the electric field is applied to the BP, a phase transition can be easily induced and the BP lattice is switched to the focal conic texture. This process is irreversible. After the texture is switched to the focal conic texture, decreasing in the electric field will not regain the BP texture which reflects colors. In general, polymer network increases the tunable wavelength; conversely, polymer network shortens the BP temperature range and thus, the color tuning is decreased. By considering both the operation temperature range and the electrically tunable range, the cell with anti-parallel rubbing has the best performance.

It should be noted that, although both substrates are with etched electrodes in the example, the etching is optional for the purpose of the invention. A cell works with unetched electrodes too.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An electro-optical device for controlling color, comprising:
a cell of the polymer-stabilized blue phase (PSBP) liquid crystal including two substrates and a blue phase liquid crystal disposed between the substrates;
an electrical field generator for generating an applied electric field on the blue phase liquid crystal, wherein the generator includes two electrodes separated by a gap between the substrates for applying the electric field in a transverse plane between the substrates;
a polymer network within the cell of PSBP liquid crystal which stabilizes the blue phase liquid crystal in a cubic lattice structure oriented to reflect or transmit an incident electromagnetic radiation into a second electromagnetic radiation having a wavelength in the visible light spectrum through birefringence induced by the electric field applied between the substrates; and
wherein at least one of the peak wavelength and the intensity of the second electromagnetic radiation is controllable by altering at least one of frequency, amplitude, wave form, and pulse width of the applied electrical field.

2. The electro-optical device according to claim 1, wherein the peak wavelength of the second electromagnetic radiation is greater than that of the incident electromagnetic radiation when the intensity of the electrical field is greater than zero.

3. The electro-optical device according to claim 1, wherein the substrates are flexible.

4. The electro-optical device according to claim 1, wherein the cell does not include an alignment layer.

5. The electro-optical device according to claim 1, which includes no polarizer and color filter.

6. The electro-optical device according to claim 1, wherein the liquid crystal is in blue phase at the operation temperature range of the device such as from about 20° C to about 30° C.

7. The electro-optical device according to claim 1, wherein the polymer-stabilized blue phase (PSBP) liquid crystal comprises a nematic liquid crystal and one or more chiral dopants.

8. The electro-optical device according to claim 7, wherein the nematic liquid crystal is selected from the group consisting of a LC with viscosity lower than 100 mPas such as MLC6080; a high birefringence LC such as BL006; a high dielectric anisotropy LC such as MLC 6080; a fluorinated LC such as ZLI 4792; and any combination thereof.

9. The electro-optical device according to claim 7, wherein the chiral dopant is an optically active organic compound selected from the group consisting of CB15, C15, R811, S811, R1011, S1011, and any combination thereof.

10. The electro-optical device according to claim 1, wherein the polymer-stabilized blue phase (PSBP) liquid crystal comprises a polymer network.

11. The electro-optical device according to claim 1, wherein the electro-optical device is a switchable filter comprised of a vertical stack of two or more cells of polymer-stabilized blue phase (PSBP) liquid crystal.

12. A method of controlling the reflection or transmission of a electromagnetic radiation in a blue phase liquid crystal electro-optical device, comprising: (i) providing a cell of polymer-stabilized blue phase (PSBP) liquid crystal; (ii) providing an electrical field generator; (iii) generating an electrical field from the generator; (iv) applying the electrical field on the liquid crystal; (v) reflecting or transmitting an incident electromagnetic radiation on the liquid crystal into a second electromagnetic radiation having a wavelength in the visible light spectrum; and (vi) varying at least one of the peak wavelength and the magnitude of the second electromagnetic radiation by varying the intensity of the electrical field.

13. The method according to claim 12, wherein the peak wavelength of the second electromagnetic radiation is greater than that of the incident electromagnetic radiation when the intensity of the electrical field is greater than zero.

14. The method according to claim 13, wherein the wavelength of the second electromagnetic radiation can be reversibly tuned back to its initial value when the electrical field is reduced to zero.

15. The method according to claim 12, wherein the providing a cell of polymer-stabilized blue phase (PSBP) liquid crystal further includes:
  forming a polymer network formed from photo-polymerization of reactive monomers; and
  localizing the polymer network on a blue phase liquid crystal to stabilize a three-dimensional structure of the BPLC while simultaneously allowing the structure to deform as the intensity of the electric field is varied.

16. The method according to claim 12, wherein the localizing increases the transition temperature range of liquid crystal blue phase and increases a tunable color range for the wavelength of the second electromagnetic radiation to cover at least the visible light spectrum.

17. The method according to claim 15, wherein the reactive monomer is selected from monomer containing mono or multiple polymerizable groups such as epoxy, vinyl ether, or any combination thereof.

18. A polymer-stabilized blue phase liquid crystal tunable filter device, comprising:
  a cell of polymer-stabilized blue phase liquid crystal (BPLC) including a BPLC and a polymer network which stabilizes a three dimensional structure of the BPLC;
  a pair of substrates disposed on opposite faces of the cell, each substrate including a polyimide alignment layer and electrodes for applying an electric field in a transverse plane between the polyimide alignment layers;
  wherein the three-dimensional structure of the BPLC includes a cubic lattice oriented to reflect or transmit an incident electromagnetic radiation into a second electromagnetic through birefringence induced by the applied electric field, the second electromagnetic radiation having a tunable color range covering at least the visible light spectrum.

19. The device according to claim 18, wherein the the polyimide alignment layers are rubbed anti-parallel.

20. The device according to claim 18, which includes no polarizer or color filter.

21. The device according to claim 18, wherein a concentration of the polymer network is between 4% and 8% by weight of blue phase liquid crystal.

22. The method according to claim 12, further including aligning the liquid crystal planar along a polyimide alignment layer.

23. The method according to claim 22, further including applying the electric field perpendicular to the polyimide alignment layer.

24. The device according to claim 1, wherein each substrate includes a rubbed polyimide alignment layer.

25. The device according to claim 1, wherein the cubic lattice changes in size as a voltage of the applied electric field is altered.

26. The device according to claim 18, wherein the polymer-network stabilizes the cubic lattice while allowing the cubic lattice to change from an initial scale to an expanded scale when a voltage of the applied electric field is increased.

27. The device according to claim 26, wherein an increase in the scale of the cubic lattice increases the wavelength of the second electromagnetic radiation.

28. The device according to claim 1, wherein the gap between the substrates is 10 microns and the electric field generator provides the electrodes with a voltage between 0 and 30 V.

* * * * *